June 2, 1964   E. McCASKEY   3,135,555
SAFETY GUARD FOR RAM OF HYDRAULIC HOIST
Filed May 13, 1963
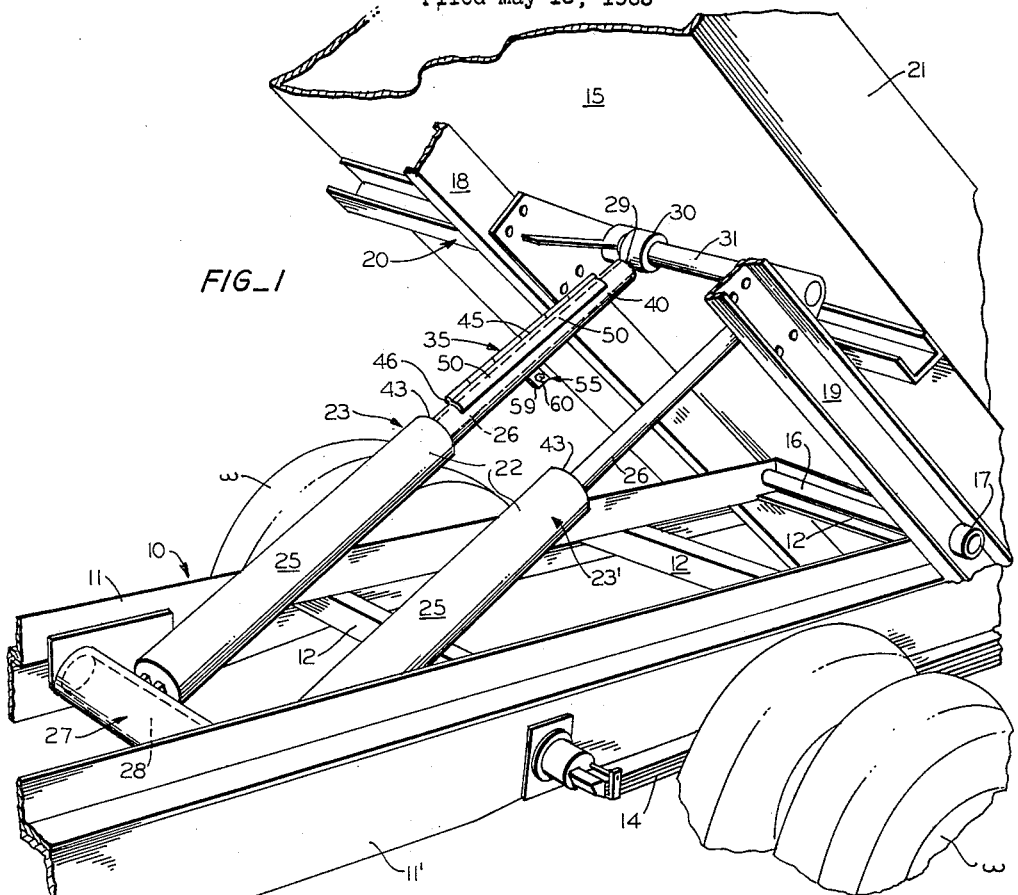
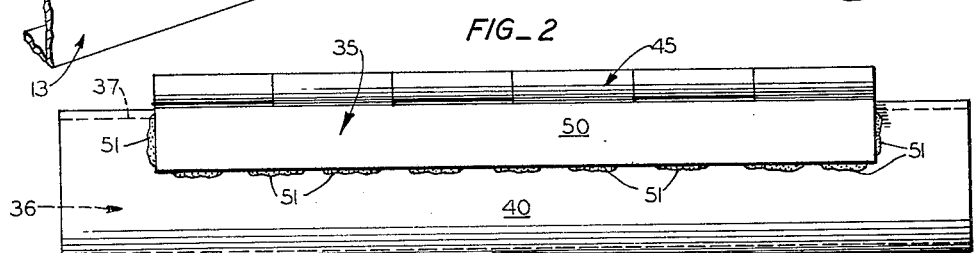
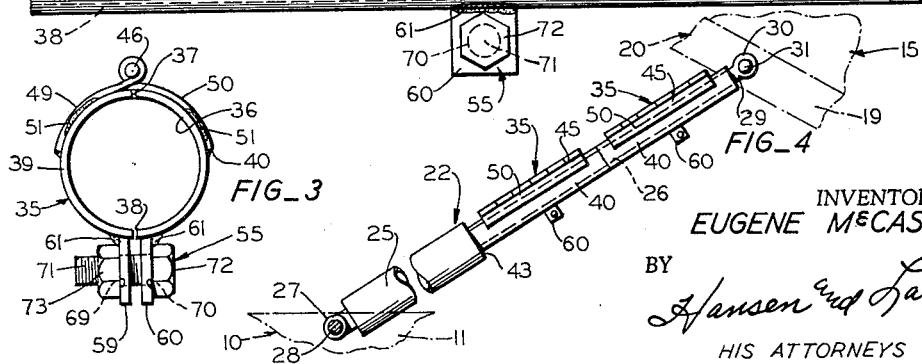
INVENTOR.
EUGENE McCASKEY
BY Hansen and Lane
HIS ATTORNEYS United States Patent Office 3,135,555
Patented June 2, 1964

3,135,555
SAFETY GUARD FOR RAM OF HYDRAULIC HOIST
Eugene McCaskey, 1004 Regent St., San Jose, Calif.
Filed May 13, 1963, Ser. No. 279,990
5 Claims. (Cl. 298—22)

This invention relates to a safety guard for hydraulic hoists and more particularly to means for locking an hydraulic ram in extended condition.

The present invention is best suited for locking the hydraulic ram or rams of a dump truck in extended condition so as to prevent accidental lowering of the load carrying body in case of faulty operation of the hydraulic system.

More particularly the present invention contemplates the provision of a quick connect lock for releasably securing the extended rod of an hydraulic ram in a safe extended condition independent of the operation of the hydraulic system.

It is another object to provide a safety guard for the rod of an hydraulic ram so constructed as to completely embrace the latter in extended condition and to hold the rod thus extended regardless of release of fluid pressure within the cylinder of the hydraulic ram.

It is yet another object to provide a tubular strut adapted to fit snugly the diameter and extended length of an hydraulic ram rod and means for opening and closing said tubular strut lengthwise.

It is a still further object to provide a tubular strut split lengthwise along diametrically opposite meeting lines with a hinge connection along one meeting line and a releasable locking means at the opposite meeting line.

These and other objects and advantages of the present invention will become apparent from a reading of the following description in the light of the accompanying drawings in which:

FIG. 1 is a fragmentary perspective view of a portion of a dump truck showing the locking device of the present invention associated therewith.

FIG. 2 is a side view of the locking device of FIG. 1 at substantially larger scale.

FIG. 3 is an end view of FIG. 2.

FIG. 4 is a side elevational view of a portion of FIG. 1 illustrating a locking means in accordance with the present invention.

Referring to FIG. 1, 10 indicates a truck chassis including parallel side channels 11 and 11' joined at the fore, medial and aft areas by cross members 12 to provide a rigid frame 13 supported on springs 14 which in turn are connected to axel housings for the wheels W in a conventional manner. A dump type body 15 is hingedly connected to the after end of the chassis 10 by a cross bar 16 having its ends journaled in bushings (one of which is shown at 17) mounted on channel members 18 and 19 of a body frame 20. The body frame 20 has secured to it a dump type body 21 which swings up and down about the hinge bar 16 with the body frame 20.

The body frame 20 is raised and lowered by means of a hydraulic ram 22, two of which are shown at 23—23' in FIG. 1. The hydraulic rams are connected to a conventional hydraulic system and controls therefor which are usually located in the cab of the dump truck and accessible to the driver of the vehicle. These rams 22 each have a cylinder 25 within which a rod 26 is guided for axial movement by means of a piston (not shown) secured to that end of the rod 26 which is within the cylinder. Each ram 22 has the closed end of its cylinder secured to a rocker sleeve 27 mounted for rocking movement on a cross shaft 28, the ends of which are supported on the parallel side channels 11 and 11' of the chassis 10. The free ends 29 of the rods 26 have bearing bosses 30 secured thereto journaled on a cross rod 31 having its ends supported in suitable brackets 32—32' which in turn are secured by bolts or the like to the respective channel members 18—19 of the body frame 20. The channel members 18—19 are disposed to straddle the side channels 11—11' of the chassis 10 and to rest parallel to them when the hydraulic rams 22 are relieved of pressure and the body frame lowered. The brackets 32—32' support cross rod 31 enough above the horizontal plane of the cross shaft 28 and cross rod 31 to be over center of the latter. Consequently when pressurized fluid is admitted into the base ends of the cylinders 25 the rams 23—23' exert an upwardly directed thrust against the cross rod 31 to swing the body frame 20 and dump body 21 upwardly (clockwise FIG. 1) about the axis of the hinge bar 16.

The foregoing is generally typical of a dump truck structure and operation and is illustrative only as to the environment in which the present invention is to be used.

It will be appreciated that should the hydraulic system connected to the rams fail there is nothing to prevent the body frame 20 and dump body from falling by gravity toward the chassis 10. Props have been used heretofore and so have locking pins between the chassis channels and the dump body frame channels. Neither of these forms of holding means have proven entirely satisfactory. The props may become displaced and/or jarred loose. The locking pins may be sheared and/or otherwise become jammed or misshapen resulting in delay in removing and replacing them.

The present invention resides in a safety guard 35 adapted to embrace the rod 26 of the hydraulic ram for locking the latter in extended condition. As best seen in FIGS. 2 and 3 the safety guard 35 forming the subject of the present invention comprises a tube 36 split lengthwise at diametrically opposite meeting lines 37 and 38 to provide half sections 39 and 40 hingedly connected along one meeting line 37 so as to open up for fitting around the rod 26 of an hydraulic ram.

The tube 36 from which the two half sections are made is of a diameter to fit that of the particular rod 26 and the length of the two halves 39—49 is such as to just cover the entire length of the rod 26 when it is extended. In other words, the hinged halves 39—49 are long enough to fit between the bearing boss 30 at the free end 29 of the rod and the upper end 43 of the cylinder 25 from which the rod 26 extends. In this manner, when the two halves 39—40 are closed into tubular condition about the rod 26 they form a solid tubular strut 36 between the bearing boss 30 and upper end 43 of the cylinder 25 to guard against the rod returning into the cylinder. The two halves 39 and 40 are therefore hereinafter referred to as a guard halves.

The two guard halves 39 and 40 are preferably connected along one meeting line (37) by a piano hinge 45 the wings 49 and 50 of which are secured as by welding 51 to the separate guard halves 39 and 40, respectively of the safety guard 35.

The hinge 45 is of a length extending appreciably more than three quarters the length of the halves 39—40 and the hinge pin 46 of the hinge lies outside the guard halves 39—40 in a plane coinciding with the diametrical plane of the meeting lines 37 and 38 of the two guard halves 39 and 40.

The meeting line 38 diametrically opposite the hinge 45 is flanked by a pair of ears 59 and 60 welded as at 61 to the respective guard halves 39 and 40 so as to extend therefrom in spaced parallel relation on either side of the diametric plane struck across the guards at the meeting lines 39 and 38. These ears 59 and 60 are of identical form and each have a bore 69—70 aligned with that of the other. Any suitable locking means 55 such as a hook, pin, bolt or the like may be used to hold the two ears together. In the present disclosure they have the shank 71 of a headed bolt 72 extending through the bores and the threaded shank 71 of bolt 72 has a nut 73 thereon to secure the two ears together. The locking means thereby maintains the guard halves 39—40 in closed condition.

In FIG. 4 the arrangement is the same as in FIG. 1 except that two safety guards 35 are shown in tandem upon a single rod 26 in abutting relation with each other and with the end 43 of the cylinder 25 as well as with the boss 30 at the upper end 29 of the rod.

With the safety guard 35 of the present invention suited for the particular length and diameter of a particular rod 26 it is a simple matter to clasp the rod within the hinged halves 39—40 to provide a tubular strut between the free end 29 of the rod and the upper end 43 of the cylinder. The safety guard 35 is quickly secured by means of bolt 55 so that the guard halves 39—40 completely circumscribe the rod 26 for its full extended length.

By this arrangement the hydraulic system although broken, leaking or intentionally released is not needed to maintain the rod 26 in extended condition. Moreover, there is no danger of the closed halves being accidentally displaced and their fitting snugly about the rod over its full length strengthens them against buckling or deflecting out of axial alignment with the rod.

While I have described my new safety guard for the rod of hydraulic rams in specific detail it will be appreciated that the same may be susceptible to alterations, modifications and/or variations without departing from the spirit of my invention therein. I therefore desire to avail myself of all variations, modifications and/or alterations as may fairly come within the purview of the appended claims.

What I claim as new and desire to protect by Letters Patent is:

1. For use on a push rod extending from the cylinder of an hydraulic ram and having a boss at its opposite end secured to a cross rod for pushing the same; a safety guard comprising a tubular strut of a diameter and length to fit said rod in its extended condition, said tubular strut consisting of a pair of tubular halves having diametrically opposite meeting lines and hingedly connected adjacent the meeting line on one side of said tubular halves whereby said halves are openable for mounting on said extended rod, and a locking means between said tubular halves at the opposite meeting line thereof for releasably securing said tubular halves relative to said extended rod.

2. For use on a push rod extending from the cylinder of an hydraulic ram and having a boss at its opposite end secured to a cross rod for pushing the same; a safety guard comprising a tubular strut of a diameter and length to fit said rod in its extended condition, said tubular strut consisting of a pair of tubular halves having diametrically opposite meeting lines, a hinge having its wings connected to said tubular halves adjacent the meeting line on one side of said tubular strut whereby said halves are openable for mounting on said extended rod, and a locking means between said tubular halves at the opposite meeting lines thereof for releasably securing said tubular halves relative to said extended rod.

3. For use on a push rod extending from the cylinder of an hydraulic ram and having its opposite end connected to a cross rod for pushing the same; a safety guard comprising a pair of tubular halves of a diameter and length to fit said rod in its extended condition, and having diametrically opposite meeting lines, a hinge having each of its wings secured to a respective one of said tubular halves adjacent the meeting line on one side of said tubular halves whereby to open said halves for mounting on said extended rod, an ear secured to each of said tubular halves adjacent the opposite meeting lines thereof, and means for releasably securing said ears together whereby said tubular halves form a tubular strut upon said extended rod for maintaining the latter in extended condition.

4. The combination with an hydraulic ram of a dump truck wherein the hydraulic cylinder has its closed end pivotally connected to the truck chassis and has a push rod extending from its opposite end which push rod has its free end pivotally connected to the swing up frame of the dump truck body for raising and lowering the same; a safety guard comprising a tubular strut of a diameter and length to fit said push rod in its fully extended condition and split longitudinally along diametrically opposite meeting lines for application to said push rod, a hinge having each of its wings secured to a respective one of said tubular halves adjacent one of said meeting lines for opening and closing said tubular halves upon said push rod, an apertured ear secured to each of said tubular halves adjacent the opposite meeting line thereof, said ears lying in parallel relation adjacent each other with their apertures aligned when said tubular halves are closed, and means extendable through the aligned apertures of said ears for securing them together.

5. A safety guard comprising a tubular strut of a diameter and length to fit a push rod extending from the cylinder of an hydraulic ram, said tubular strut having diametrically opposite meeting lines providing tubular halves lengthwise thereof, a hinge having each of its wings secured to a respective one of said tubular halves adjacent one of said meeting lines for mounting said tubular halves upon said extended rod, and a locking means between said tubular halves at the meeting line opposite said hinge comprising a pair of apertured ears each secured to a respective one of said tubular halves adjacent the opposite one of said meeting lines, and a bolt extending through the apertured ears for securing them together.

References Cited in the file of this patent

UNITED STATES PATENTS

| 409,394 | Duff | Aug. 20, 1889 |
| 1,046,145 | Budesheim | Dec. 13, 1912 |
| 2,312,871 | Brick | Mar. 2, 1943 |
| 2,397,516 | Stewart | Apr. 2, 1946 |
| 2,925,802 | White | Feb. 23, 1960 |

FOREIGN PATENTS

| 640,727 | Canada | May 1, 1952 |